United States Patent [19]
Goldschmidt

[11] Patent Number: 5,340,216
[45] Date of Patent: Aug. 23, 1994

[54] UNIFORM TEMPERATURE REFERENCE APPARATUS FOR USE WITH MODULAR SCREW-TERMINAL BLOCK

[75] Inventor: Robert E. Goldschmidt, Needham, Mass.

[73] Assignee: Kaye Instruments, Inc., Bedford, Mass.

[21] Appl. No.: 997,838

[22] Filed: Dec. 29, 1992

[51] Int. Cl.⁵ .............................. G01K 7/12; H01R 4/50
[52] U.S. Cl. .................................... 374/182; 439/807
[58] Field of Search ................. 374/182; 165/80.2; 439/797, 798, 806, 807

[56] References Cited
U.S. PATENT DOCUMENTS

| | | | |
|---|---|---|---|
| 3,648,523 | 3/1972 | Kemper et al. | 374/182 |
| 4,077,696 | 3/1978 | Glaesel | 439/806 |
| 4,695,920 | 9/1987 | Klebba et al. | 439/806 X |
| 4,718,777 | 1/1988 | Mydynski et al. | 374/181 |

FOREIGN PATENT DOCUMENTS

| | | | |
|---|---|---|---|
| 0675422 | 5/1939 | Fed. Rep. of Germany | 439/807 |
| 2655216 | 6/1978 | Fed. Rep. of Germany | 439/807 |

Primary Examiner—William A. Cuchlinski, Jr.
Assistant Examiner—W. Morris Worth
Attorney, Agent, or Firm—Rines & Rines

[57] ABSTRACT

A uniform temperature reference block for connection with the cold reference wires of a plurality of thermocouples employing a corresponding plurality of screw terminal modular connectors each provided with an insulated termination cavity containing a terminal conductor compressable, upon tightening the screw, against the thermocouple input wire and, in turn, the wire against an adjacent electrically insulated but thermally conductive projection of a thermal bridging bar, preferably of anodized aluminum, within the termination cavity, to establish electrical termination connection of the thermocouple wire with thermal coupling along the block.

10 Claims, 2 Drawing Sheets

UNIFORM TEMPERATURE REFERENCE APPARATUS FOR USE WITH MODULAR SCREW-TERMINAL BLOCK

The present invention relates to uniform temperature reference apparatus (UTR) embodying a plurality or matrix of electrically isolated terminations for thermocouple wires which are held mutually isothermal. The point at which the thermocouple is connected to a copper terminal is commonly referred to as the cold junction.

BACKGROUND OF INVENTION

Many industries have need for the making of accurate temperature measurements utilizing pluralities of thermocouples. A key source of temperature measurement error in such systems, however, is the temperature difference between any of the cold junction thermocouple connections and a cold Junction reference sensor. The UTR apparatus is designed to increase the thermal conduction path between the cold junctions of the plurality of thermocouples and the cold junction reference, while preserving electrical isolation between these points.

To attain such electrical isolation but with thermal connection, various techniques have been earlier employed including those embodied in the Model UTR-48N and the DIG14 Model V2222 of the assignee of the present application, as described, for example, in the Kaye Product Data Sheet #506, Thermocouple Reference Systems and Data Sheet #500. In the aluminum frame carrying the epoxy-mounted matrix of heavy copper terminals of such apparatus, BeO ceramic wafers, metalized only on their two faces, are soldered between the copper terminals to form the matrix, with the ceramic body of the wafers providing excellent electrical isolation between terminals; and, because of the excellent thermal conductivity of such ceramic (approaching that of the aluminum frame), provides superior thermal coupling between terminals necessary to attain the desired uniform thermal reference function. As a result, the thermocouple reference junctions of all channels on the UTR plate are maintained at the same temperature, and one sensor, as before-described, may be employed to monitor the entire isothermal plate. A foam-filled enclosure thermally isolates the UTR terminal plate from ambient temperature changes, so that the response to a change in ambient temperature is extremely slow.

Multiple units, indeed, may be ganged together, if desired, to accomodate for any number of channels, and the UTR apparatus may be operated as shielded or unshielded units.

The construction required for the above and other previous UTR assemblies, however, has rendered such devices relatively expensive to manufacture, and quite specialized in components and assembly.

In accordance with the present invention, on the other hand, a novel UTR design has been evolved which is suitable for use with modular screw-terminal blocks, while obviating the need for ceramic wafers and the like, and with attendant lower cost manufacture and assembly (including by the end user), and with a higher degree of accuracy from close thermal contact of each UTR member with the associated cold junction and with shortened thermal paths.

OBJECTS OF INVENTION

An object of the present invention, accordingly, is to provide a new and improved UTR apparatus, and one which is adapted to use modular screw-terminal blocks, providing the above-mentioned and other improved results.

Other and further objects will be explained hereinafter and are more particularly delineated in the appended claims.

SUMMARY OF INVENTION

In summary, from one of its viewpoints, the invention embraces a uniform temperature reference block system for connection with the cold reference wires of a plurality of thermocouples having, in combination, a corresponding plurality of screw-terminal modular connectors each provided with an insulated termination cavity containing a termination conductor and having, at one region, space for receiving the input wire of a thermocouple adjacent said conductor and, adjacent another region, a terminal screw; an electrically insulated but thermally conductive thermal bridging bar externally extending along the modular connectors with projections insertable in said space between the said input wire of the thermocouple and the wall of the termination cavity at said one region; the terminal screw being operable, upon tightening, to press said termination conductor in the termination cavity against one side of the thermocouple input wire to establish compressional electrical connection thereto and to compress the other side of said wire into compressional thermal contact with the corresponding projection of the thermal bridging bar.

Preferred and best mode embodiments and designs are hereinafter more fully set forth.

DRAWINGS

The invention will now be described with reference to the accompanying drawings, FIG. 1 of which is an isometric view of a preferred embodiment of the invention, illustrating details of construction and use;

DESCRIPTION OF PREFERRED EMBODIMENT

In the previously described prior UTR systems, the thermocouple wire to be terminated is inserted into a termination cavity and then the associated screw is tightened to squeeze the wire against the terminating copper conductor, which is a mechanical part of the terminal block, forming the thermocouple-to-copper cold junction before-described.

Figure 1:
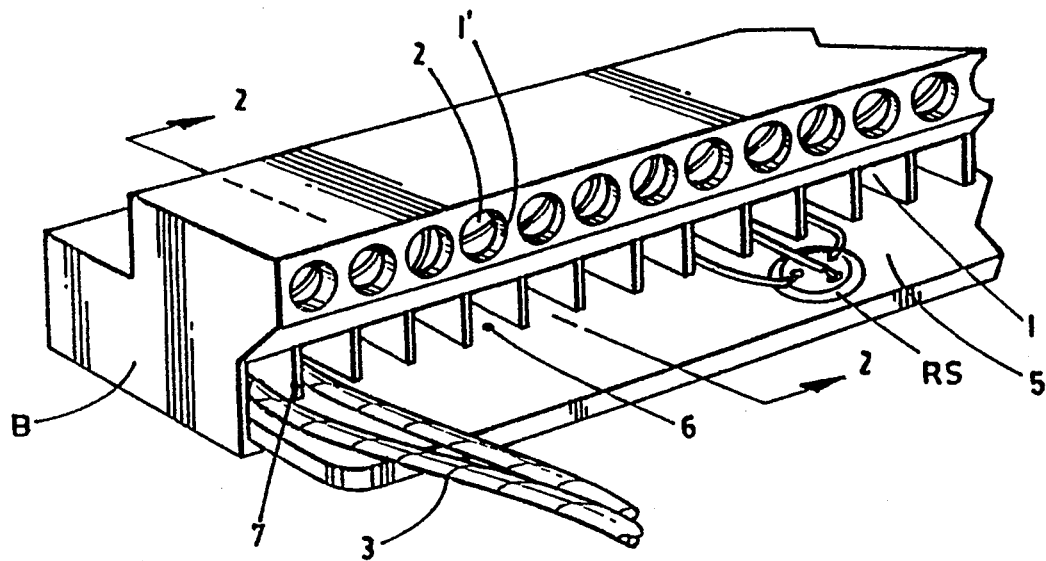
Figure 2:
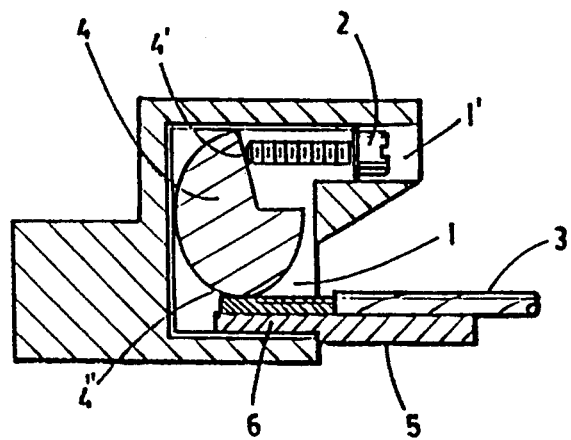
FIG. 2 is a transverse section taken along the line 2—2 of FIG. 1.

The present invention, as shown in FIG. 1, employs a novel thermal bridging bar 5 in conjunction with a modular screw-terminal block B having intermediate termination cavities 1 into an end region or space of which (shown as the bottom) extensions or projections 6 from an external thermal bridging bar 5 (thermally conductive, but electrically insulative) are inserted in the manner more particularly shown in FIG. 2. The thermocouple input wire bared end 3 is inserted into that bottom end space region adjacent the thermal bridging bar projection member 6 in the termination cavity 1. Each cavity, in turn, is insulated at 7 in the connector block B. By tightening the screw 2 in an upper cavity 1', pressure is exerted against a flange 4' in a copper terminating conductor 4 within the separate termination cavity 1, FIG. 2, remotely compressing the lower surface 4" of the conductor 4 against one side (upper) of thermocouple input wire B, and in turn compressing the other (bottom) side of the wire against the thermal bridging bar projection member 6 in the lower or bottom end region of the copper modular connector block B.

The invention thus involves a UTR used in conjunction with modular connectors where the tightening screw 2 is in one insulated cavity 7 of the connector block, shown as an upper cavity, and the termination of thermocouple wire B to the connector 4 takes place remotely in a separate cavity 1 therebelow.

Tightening the screw 2 forms a sandwich of the thermal bridging bar member 6, thermocouple wire 3 and the terminating copper conductor 4. This scheme holds the UTR in as close thermal proximity to the thermocouple cold junction as may be desired. In order to optimize its UTR properties, the thermal bridging bar 5-6 is designed so that it is a good thermal conductor, but an electrical insulator, as later more fully discussed.

The UTR assembly is one continguous piece of insulated metal. There are no composite assemblies or added insulating or thermally conductive parts. In the termination cavity 1, both thermal and electrical termination take place simultaneously. One side of the thermocouple input wire end is pressed against an electrical conductor 4 to establish electrical connecting or contact, while the other side of the wire end is pressed against the thermal conductor 6 (the UTR) to establish thermal connection or contact with the bridging bar.

Figure 3:
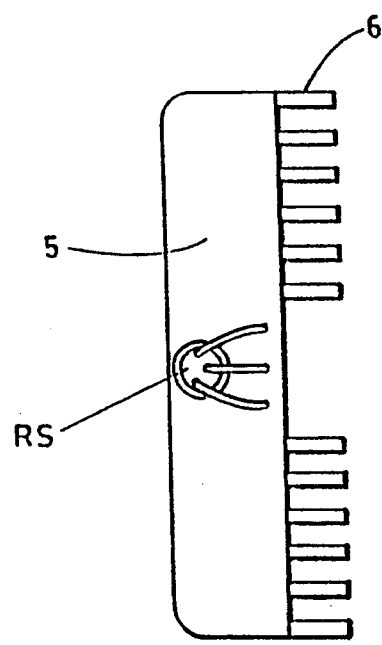
FIG. 3 is a side elevation of the novel thermal bridging bar used in the invention.

In a preferred embodiment of this concept, hard-anodized aluminum is used for the thermal bridging bar 5-6, as more fully shown in FIG. 3. The aluminum core provides good thermal coupling while the hard anodizing provides electrical insulation between the UTR and the thermocouple wire and copper termination connector contacts in each block.

A cold junction reference sensor RS may be mounted on the body of the thermal bridging bar, as shown in FIGS. 1 3, or alternatively in close thermal proximity to one of the connector cavities, utilizing the thermocouple termination conductor 4 far its electrical connection to the system.

Among the advantages of such a novel UTR design are the high degree of accuracy attainable in view of the fact that each UTR member 6 is in close thermal contact to the associated cold junction 3, and the inherent low cost of manufacture, since only one mechanical part is required to provide the UTR. As before mentioned, moreover, the mounting of the UTR may be provided by the end user of the system, minimizing labor.

The use of modular connectors, moreover, reduces the physical extent of the UTR and therefore increases the UTR accuracy since thermal conduction paths are shortened. The non-shearing form of wire termination means that wire ends 3 may be placed directly in the cavity 1 without fear of damage, and that abrasion and possible damage of the UTR insulating surface is minimized. Importantly, the cost of manufacture and installation of the UTR is dramatically reduced over other approaches. The UTR may be a single die cast aluminum piece with no machining required except deburring. As before stated, the entire UTR is hard-anodized and may be formed in a single operation. The installation involves only tightening the unused connections on the modular connector. The user makes all of the other thermal connections when terminating the thermocouples. Since the termination is performed without shearing motion (as is present in prior screw type connectors), the user need not terminate the thermocouples with copper spade or ring lugs, which not only add to installation cost but affect accuracy, since the thermocouple-to-copper transition then takes place farther from the UTR.

Further modifications will occur to those skilled in this art, and such are considered to fall within the spirit and scope of the invention as defined in the appended claims.

What is claimed is:

1. A uniform temperature reference block system for connection with input reference wires of a plurality of thermocouples and forming cold junctions therewith, said system comprising:
   a metallic modular connector block having a plurality of insulated termination cavities formed therein;
   a pair of openings communicating with each said cavity, one of said pair of openings receiving a terminal screw and a second of said pair of openings receiving a bared end of an input reference wire;
   a termination conductor within each said cavity engageable with a corresponding terminal screw at one end and the bared end of and input reference wire at a second end;
   an electrically insulated but thermally conductive thermal bridging bar externally extending along the openings of the cavities of said block and having a plurality of projections corresponding to the plurality of pairs of openings, said projections being insertable into said cavities through said second openings, each projection being positioned between one wall of a corresponding cavity and the bared end of an input reference wire;
   whereby turning of the termination screw presses the corresponding termination conductor against one side of the bared end of a reference wire to establish compressional electrical connection thereto and to compress an opposite side of the bared end into compressional thermal contact with the corresponding projection of the thermal bridging bar.

2. A uniform temperature reference block system as claimed in claim 1 and in which the screw turning and the establishment of electrical connection of the bared end of the input thermocouple wire and the termination conductor are effected near opposite end regions of the termination cavity.

3. A uniform temperature reference block system as claimed in claim 1 and in which electrical connection and thermal contact with the bared end of the thermocouple input wire are effected simultaneously upon the tightening of the screw.

4. A uniform temperature reference block system as claimed in claim 1 and in which the modular connector block is of one contiguous piece of insulated metal.

5. A uniform temperature reference block system as claimed in claim 1 and in which the thermal bridging bar and its projections are of anodized aluminum providing both good thermal coupling and electrical insulation.

6. A uniform temperature reference block system as claimed in claim 1 and in which a cold junction reference sensor is mounted upon the bridging bar, with the said termination conductor providing its electrical connection to the system.

7. A uniform temperature reference block system for connection with an input reference wire of a thermocouple and forming cold junction therewith, said system comprising:

a metallic modular connector block having an insulated termination cavity formed therein;

a pair of openings communicating with said cavity, one of said pair of openings receiving a terminal screw and a second of said pair of openings receiving a bared end of said input reference wire;

a termination conductor within said cavity engageable with the terminal screw at one end and the bared end of the input reference wire at a second end;

an electrically insulated but thermally conductive thermal bridging bar externally extending along the openings of the cavity of said block and having a projection insertable into said cavity through said second opening, the projection being positioned between one wall of the cavity and the bared end of the input reference wire;

whereby turning of the termination screw presses the termination conductor against one side of the bared end of the reference wire to establish compressional electrical connection thereto and to compress an opposite side of the bared end into compressional thermal contact with the projection of the thermal bridging bar.

8. A modular connector as claimed in claim 7 and in which the thermal bridging bar projection are of anodized aluminum.

9. A modular connector as claimed in claim 7 and in which said one end of the termination conductor is its upper end and the said second end is its lower end.

10. A modular connector as claimed in claim 9 and in which said termination conductor is flanged at its upper end to be compressed by the tightening of said terminal screw, forcing engagement at its lower end with said one side of the bared end of the thermocouple input wire, while compressing opposite side of said bared end of said thermocouple input wire against said thermal bridging bar projection.

* * * * *